(12) United States Patent
Raz

(10) Patent No.: US 7,987,951 B2
(45) Date of Patent: Aug. 2, 2011

(54) ELECTROMECHANICAL PARKING BRAKE

(75) Inventor: Dan Raz, Haifa (IL)

(73) Assignee: Mag-Eh Ltd., Hashofet (IL)

( * ) Notice: Subject to any disclaimer, the term of this patent is extended or adjusted under 35 U.S.C. 154(b) by 879 days.

(21) Appl. No.: 11/964,855

(22) Filed: Dec. 27, 2007

(65) Prior Publication Data
US 2008/0156568 A1    Jul. 3, 2008

(30) Foreign Application Priority Data
Dec. 27, 2006   (IL) .......................................... 180398

(51) Int. Cl.
*F16D 65/08* (2006.01)
(52) U.S. Cl. .................. 188/72.1; 188/162; 188/265
(58) Field of Classification Search ................. 188/72.1, 188/158, 162, 265, 156; 303/89
See application file for complete search history.

(56) References Cited

U.S. PATENT DOCUMENTS

| 6,851,525 | B2 | 2/2005 | Baier-Welt et al. |
| 6,978,870 | B2 | 12/2005 | Powrozek et al. |
| 7,021,415 | B2 | 4/2006 | Farmer et al. |
| 2002/0185343 | A1* | 12/2002 | Wedge et al. ................. 188/162 |
| 2004/0182653 | A1 | 9/2004 | Lerouge et al. |
| 2005/0225166 | A1 | 10/2005 | Greenberg et al. |
| 2006/0157308 | A1 | 7/2006 | Hartig et al. |
| 2006/0169548 | A1 | 8/2006 | Corbett et al. |
| 2006/0169553 | A1 | 8/2006 | Geyer |
| 2006/0231352 | A1 | 10/2006 | Funk et al. |
| 2006/0267402 | A1 | 11/2006 | Leiter et al. |

FOREIGN PATENT DOCUMENTS

| DE | 10157462 | 6/2003 |
| EP | 1321339 | 6/2003 |
| FR | 2761654 | 10/1998 |
| GB | 146272 | 9/1921 |

OTHER PUBLICATIONS

European Search Report for Application No. 07254895.1-2423 dated Aug. 24, 2010.

* cited by examiner

*Primary Examiner* — Melanie Torres Williams
(74) *Attorney, Agent, or Firm* — Bachman & LaPointe, P.C.

(57) ABSTRACT

There is provided an electromechanical actuator for a parking brake system of a vehicle, including an electric motor, reduction gear train associated with the motor for transmitting motion from the motor to a single power transmission chain sprocket, one power transmission chain section drivable by the sprocket partly encircling one sheave, rotatably mounted on a free longitudinally movable pulley block, an end of the power transmission chain being attached to a first stationary anchor point, and a connector connecting the pulley block to the vehicle's parking brake system.

27 Claims, 4 Drawing Sheets

ELECTROMECHANICAL PARKING BRAKE

FIELD OF THE INVENTION

The present invention relates to an electromechanical parking brake actuator for motor vehicles, and more particularly to a linear electromechanical push-pull actuator intended for tensioning the parking brake cable or lever and the releasing thereof.

BACKGROUND OF THE INVENTION

Vehicular brake mechanisms generate braking torque to the vehicle's wheels, comprising, for example, drums with friction linings or a caliper that presses friction pads against disks. The braking mechanism is designed so that application of force will cause braking torque build-up, while release of the force will remove the braking torque. In motor vehicles, the service brake system generally consists of hydraulically operated disk or drum brakes actuated by foot force, normally vacuum or pressure boosted. The parking brake is normally manually activated on a pair of front or rear wheels by means of mechanical links boosting the hand force and performing the same disk clamping or drum shoe expanding as the hydraulic service system. Steel wire cables, partially running in flexible spring sleeves, are used to deliver the braking force from the hand brake lever to the associated wheels In order to eliminate the long and complex running path of the wire cables, Electric Parking Brake (EPB) systems have been provided in vehicles. Such systems allow remote, and sometimes, automatic application and release of the parking brake. These systems typically include an electro-mechanical actuator connected to the service brake either by a cable, as in the drum configuration, or directly attached to the caliper. The actuator converts electrical current to rotational mechanical output power for pulling the cable or driving a screw and apply the brakes. Unlike traditional manual or pedal-operated parking brakes, the actuator is driven to activate the parking brake by an electrical switch ergonomically located on the dashboard panel. The parking brake may be automatically deactivated when shifting to drive gear. In addition to enhanced convenience and freed space, this system may prevent human errors such as forgetting to release the parking brake.

Various construction alternatives were proposed during the last years, examples of such prior arts, using cable tensioning mechanism, can be found in U.S. Pat. No. 7,021,415, U.S. Publications 2004/0026195, 2005/0000762, 2005/0225166 (to the same applicant), 2006/0157308, 2006/0169553, 2006/0231352. Examples of direct coupled devices can be found in U.S. Publications 2006/0169548, 2006/0267402.

In electrical parking brakes, the measured current consumption of the electric motor is used to determine the braking force. The current consumption of the motor raises gradually while braking force is applied, until a certain predefined current level is drawn indicating that the desired braking force has been reached. A current cutoff is activated to stop the motor at the desired braking force. A self-locking worm gearing or small pitch lead screw drive are typically used to maintain the applied force despite cutting of the electric motor.

The use of such low efficiency self-locking drives, however, require the use of bigger motors having higher current consumption and lower sensitivity in determining the desired braking force. Furthermore, a longer period of time may be required to apply or release the brake. Other prior art electromechanical parking brake systems facilitate transition from the circular motion of the motor to the linear motion of the cable by utilizing a reeling mechanism or serrated rack. These methods feature limited longevity.

SUMMARY OF THE INVENTION

It is thus one of the objects of the present invention to provide an actuator for parking brakes of vehicles that is basically simple, load sensitive, does not take up much space, is fast responding, uses low-power inexpensive motors and has a very long service life. It also provides for manual release of the brakes in case of electric power failure.

According to the present invention there is provided an electromechanical actuator for a parking brake system of a vehicle, comprising an electric motor, reduction gear train associated with said motor for transmitting motion from said motor to at least a single power transmission chain sprocket, at least one power transmission chain section drivable by said sprocket partly encircling at least one sheave, rotatably mounted on a free longitudinally movable pulley block, an end of said power transmission chain being attached to a first stationary anchor point, and a connector connecting said pulley block to the vehicle's parking brake system.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1a and 1b are schematic perspective and front views, respectively, of a preferred embodiment according to the present invention, showing subassembly of the actuator in a released state;

FIGS. 2a and 2b are schematic perspective and front views, respectively, of the preferred embodiment of FIGS. 1a and 1b, showing subassembly of the actuator in an activated state;

Figure 1A:
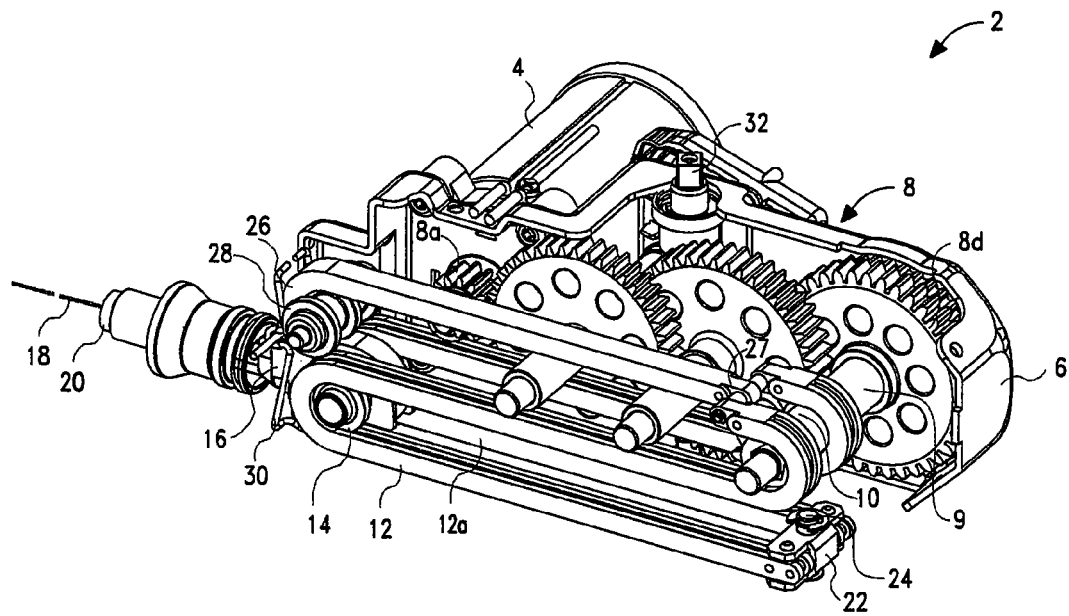
Figure 1B:
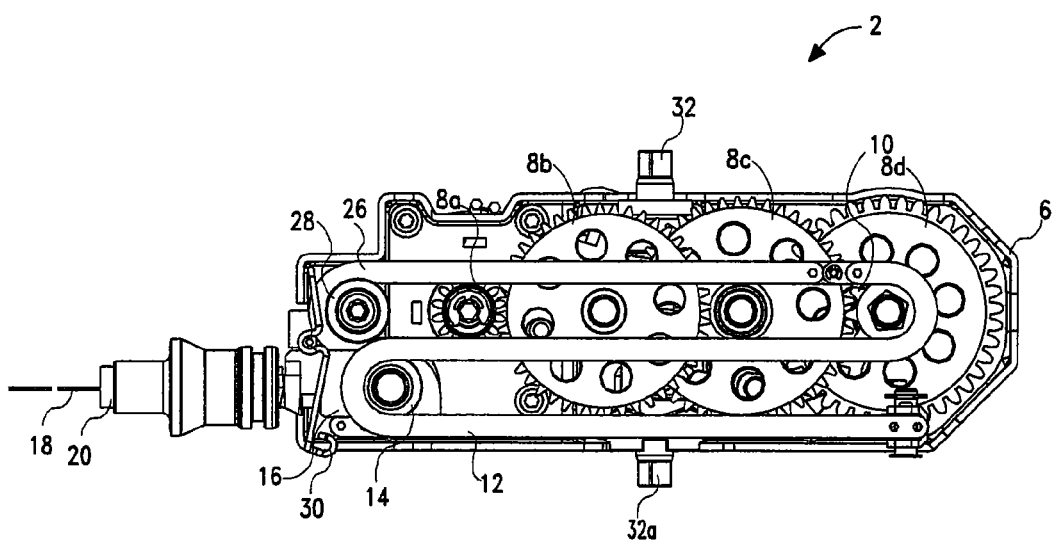
Figure 3:
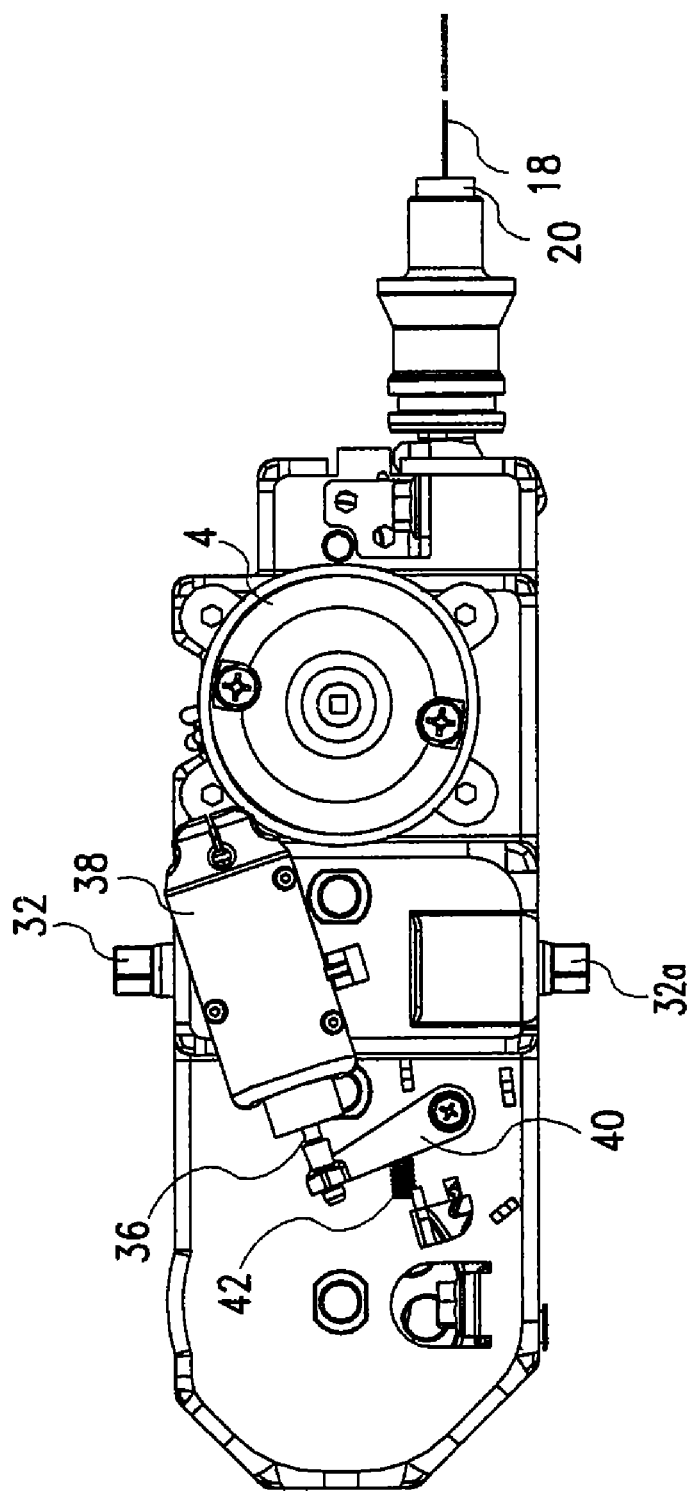
Figure 4A:
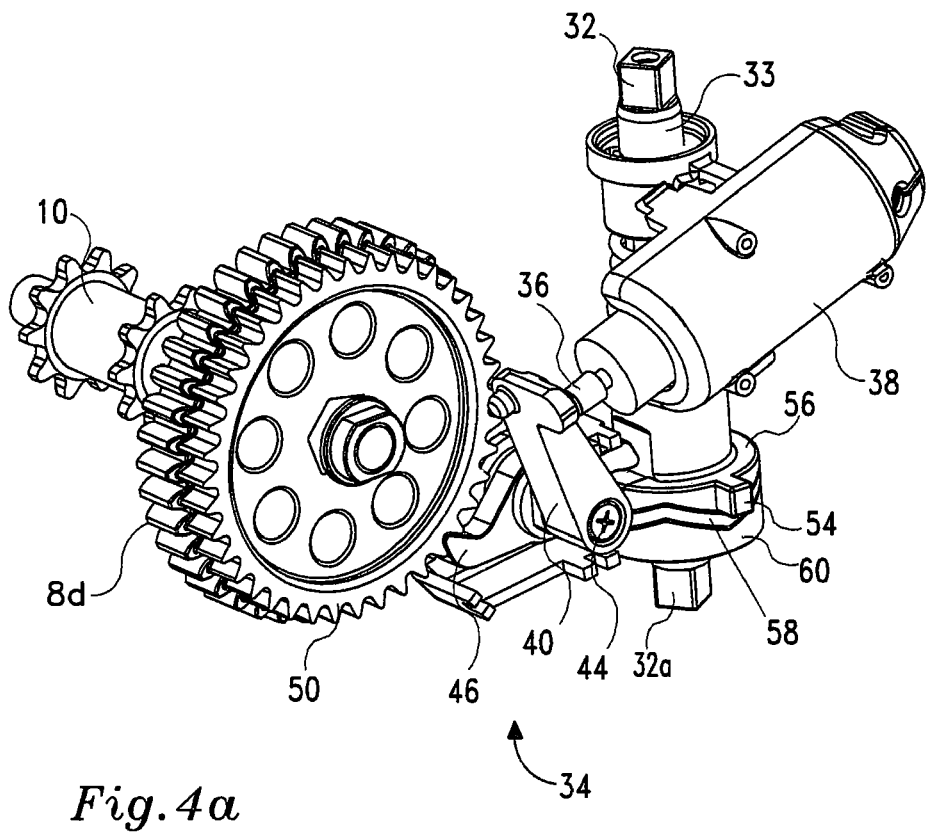
Figure 4B:
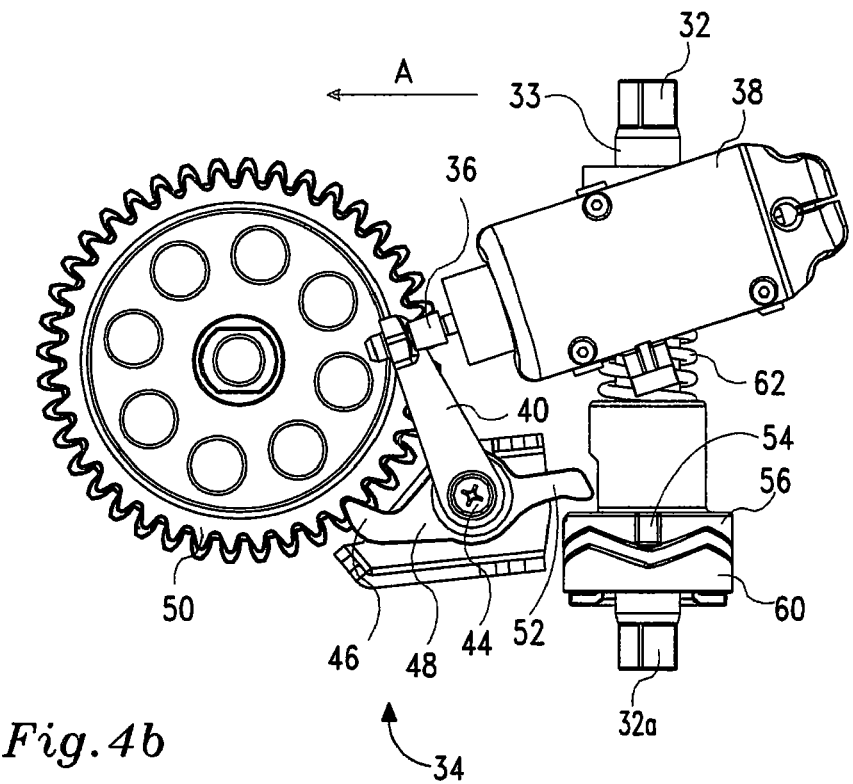

FIG. 3 is a schematic back view of the preferred embodiment of FIGS. 1a and 1b, showing the subassembly of the actuator, and FIGS. 4a and 4b are schematic perspective and front views, respectively, of the preferred embodiment of FIGS. 1a and 1b, showing a ratchet and releasing subassembly, including manual release arrangement.

DETAILED DESCRIPTION OF THE PREFERRED EMBODIMENTS

Figure 2A:
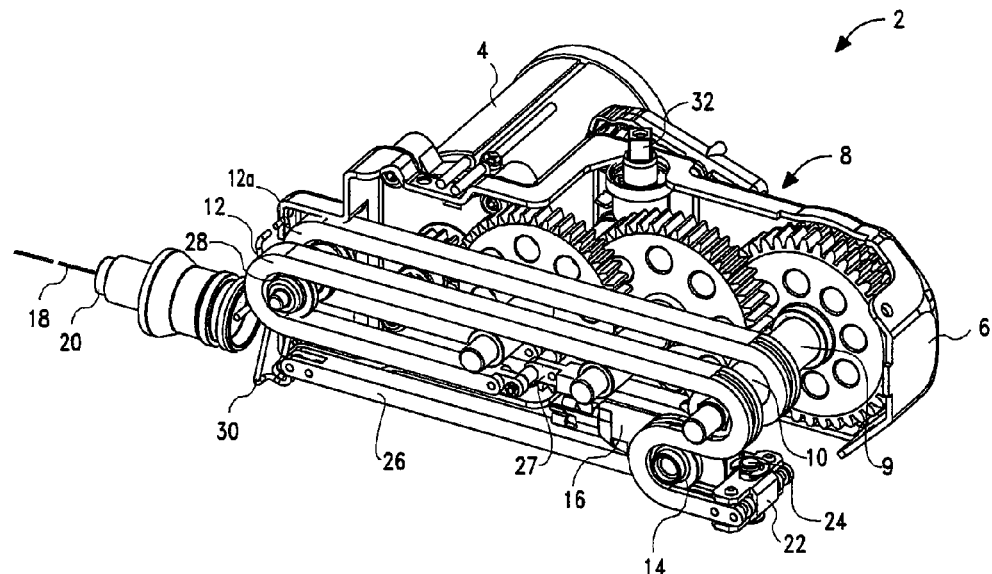
Figure 2B:
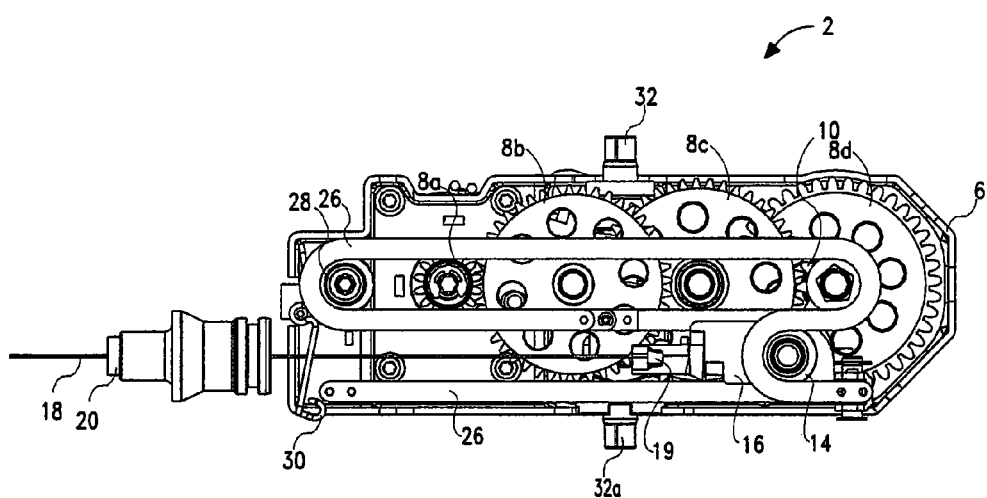

Referring now to a preferred embodiment according to the invention, there are seen schematic perspective and front views, respectively, of the subassembly, generally referenced 2, in a released state (FIGS. 1a and 1b), and in an activated state (FIGS. 2a and 2b).

A reversible electric motor 4 mounted on bracket 6 is coupled to a three-stage reduction gear train generally referenced 8. The reduction gear train 8 comprises pinion 8a mounted on a rotor shaft of motor 4, first gear 8b, second gear 8c and last gear 8d. The last gear 8d is fixedly attached to shaft 9 with integral dual sprocket 10. The reduction gear train 8, is composed of spur or helical gears, known to be non-locking, in the sense that it enables deliverance of torque from the motor 4 to the dual sprocket 10, and vice-versa.

Dual sprocket 10, is rotated as a unit with the last gear 8d and drives a pair of identical schematically shown power transmission chain (e.g., roller chain) sections 12, 12a, partly encircling the two outer sheaves of main triple sheave 14. The main triple sheave 14 is rotatably mounted on a free longitudinally movable pulley block 16. The pulley block 16, in turn, pulls cable 18, anchored on its first end to the pulley block 16, preferably with a crimped sleeve 19 (FIG. 2b). The cable 18 exits through a cable conduit 20 and its external second end is operationally coupled to the vehicle's brake units (not shown). The first ends of power transmission chain sections 12 and 12a are connected to each end of a tension equalizing lever 22 (FIGS. 1a, 2a), which is pivoted at its center via pivot 24 to a fixed anchor point (not shown), stationary with relation to bracket 6. The tension equalizing lever 22 appropriately inclines over pivot 24 in such a manner that it balances the tension of power transmission chain section 12 with that of power transmission chain section 12a, irrespective of an initial, or an over time-developed, difference in length between power transmission chains 12, and 12a.

Single auxiliary flexible member section 26 (e.g., elastic strip, wire, cable, chain etc.) is connected at its first end 27, to and between the second ends of the chain sections 12 and 12a. The flexible member section 26 further partly encircles the central sheave of secondary fixed triple sheave 28, partly encircles the central sheave of the main triple sheave 14, and is anchored by its second end via tensioning spring 30 to a fixed anchor point (not shown), stationary with relation to bracket 6.

In operation, when the parking brake is applied, the chain sections 12, 12a are driven by the rotation of the dual chain sprocket 10, shortening the load carrying portion of chain sections 12, 12a, such that the main triple sheave 14 is pulled, also pulling behind pulley block 16, and anchored cable 18, from the released state (FIGS. 1, 1a), to the activated state (FIGS. 2, 2a). Chain sections 12, 12a convert the torque exerted by dual sprocket 10, into a linear motion, and serve as a simple tension doubler, in the sense that the tension of the cable 18 is double the tension in the carrying portion of the chain sections 12, 12a. Flexible member section 26 does not carry any load but is only intended to take up the slack of chain section 12, 12a that is drawn after the dual sprocket 10. As seen in the drawings, this unique arrangement keeps total length and the fixing end points of the attached chain sections 12, 12a and 26, constant, while the triple sheave 14 travels along its path between the two extreme end points.

As opposed to some prior art, the proposed simple chain sections arrangement, permit transformation of the gear rotational motion into a linear motion without reeling of the steel cable 18 on a small sheave, as such reeling may adversely shorten the cable life cycle. Additionally, it should be noted that the actuator is able to push a load, if a rod is installed instead of cable 18.

Although a three-stage spur type reduction gear was chosen for the above described preferred embodiment, several types of gearing and different reduction levels can be applied to drive the proposed roller system. For example, any combination of planetary, worm, or bevel gear systems, as well as plain or toothed belt drives, may be used. The motor pinion and first gear stages are moderately loaded and may use plastic components, preferable for their silent operation and reduced weight and cost.

In a simplified embodiment of the present invention, dual sprocket 10, may be replaced with a single sprocket, the pair of chain sections 12, 12a may be replaced with a single chain, the main triple sheave 14 may be replaced with a single sheave, and auxiliary flexible member 26 may be omitted. In such an arrangement, the single chain slack may be collected in a chamber or pulled by a spring. The simplified arrangement, however, is not capable of pushing a load.

As mentioned above, the reduction gear train 8 is preferably of the non-locking type. As a result, after the required braking force is applied, and the motor 4 current is cut off, the braking force will gradually be reduced by the tensioned cable 18 rotating the reduction gear train 8 and motor 4 in the reverse direction. In order to keep the tension of the cable 18 after the motor 4 current is cut off, a ratchet mechanism 34 is provided.

The details of ratchet 34 are best seen in FIGS. 3, 4a and 4b. A dual arm lever 48 is rotatably mounted on pivot 44, loaded with a spring (not shown), forcing first arm toothed end 46 to engage toothed wheel 50, which is fixedly attached to one of the gears of gear train 8, preferably to the last gear 8d. Optionally, the dual arm lever 48 and toothed end 46, may engage directly into one of the gears of gear train 8, eliminating the need of toothed wheel 50. The spring loaded dual arm lever 48, permits rotation of toothed wheel 50 in the direction of tensioning of cable 18, but blocks rotation in the direction of releasing the brakes. Plunger 36 of solenoid 38 is, upon application of voltage, movable in the direction of arrow A, to push lever 40 against spring 42 (FIG. 3). The lever 40 swivels about same pivot 44 as the dual arm lever 48, and is unidirectionally engaged with lever 48, such that activation of lever 40 by solenoid 38, also rotates dual arm lever 48 to release the first arm toothed end 46 of lever 48, from toothed wheel 50. Rotation of the dual arm lever 48, nevertheless, does not affect lever 40.

Second arm 52 of dual arm lever 48 is engaged with a manual release mechanism optionally provided for manual release of the parking brake in the event of electric power failure. The manual release mechanism consists of a gripping means, e.g., square heads 32 and 32a, which facilitates limited rotation of shaft 33 by means of an external tool (not shown). Wavy faced ring 60 is fixedly attached to shaft 33, and forced against complementary wavy faced ring 56 via intermediate wavy faced ring 58 by a compression spring 62. Upon turning either head 32 or 32a, the inclined planes of wavy faced ring 60 slide over the inclined planes of ring 58, which in turn slide over the inclined planes of wavy faced ring 56, thus lifting ring 56 against the force of compression spring 62. Ring 56 lifts the dual arm lever second arm 52 causing lever 48 to swivel around pivot 44. Tooth 46 is thereby released from toothed wheel 50. Consequently, the entire reduction gear train 8 is released, as described above with reference to the solenoid 38 release mechanism.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An electromechanical actuator for a parking brake system of a vehicle, comprising:
   an electric motor;
   reduction gear train associated with said motor for transmitting motion from said motor to at least a single power transmission chain sprocket;
   at least one power transmission chain section drivable by said sprocket partly encircling at least one sheave, rotatably mounted on a free longitudinally movable pulley block, an end of said power transmission chain being attached to a first stationary anchor point, and
   a connector connecting said pulley block to the vehicle's parking brake system;
   wherein:
   said power transmission chain sprocket is a dual power transmission chain sprocket.

2. An electromechanical actuator as claimed in claim 1, wherein said power transmission chain section, is a pair of identical power transmission chain sections, each having a first end and a second end, and both being driven by said dual power transmission chain sprocket partly encircling two outer sheaves of a main triple sheave, rotatably mounted on a free longitudinally movable pulley block, first ends of said pair of power transmission chain sections being attached to said first stationary anchor point.

3. An electromechanical actuator as claimed in claim 2, further comprising a single auxiliary flexible member section having a first and a second end, said flexible member being connected at its first end, to and between the second ends of said pair of power transmission chain sections, said single flexible member section partly encircling the central sheave of a secondary fixed triple sheave, partly encircling the central sheave of said main triple sheave, and being attached by its second end to a second stationary anchor point.

4. An electromechanical actuator as claimed in claim 2, wherein the first ends of said pair of power transmission chain sections are connected to each end of a tension equalizing lever, pivoted at its center to said first stationary anchor point.

5. An electromechanical actuator as claimed in claim 3, wherein said auxiliary flexible member is fixed by its second end, to said second stationary anchor point, via a tensioning spring.

6. An electromechanical actuator as claimed in claim 1, wherein said reduction gear train is of a non-locking type.

7. An electromechanical actuator as claimed in claim 6, wherein said reduction gear train is a three-stage spur gear train.

8. An electromechanical actuator as claimed in claim 6, including a ratchet mechanism for preventing said reduction gear train from rotation at least to the brake release direction.

9. An electromechanical actuator as claimed in claim 8, wherein said ratchet mechanism is operative by a toothed ended first arm of a pivoted, spring loaded, dual arm lever, engaged into a toothed wheel fixedly attached to one of the gears of said gear train.

10. An electromechanical actuator as claimed in claim 8, wherein said ratchet mechanism is releasable by means of an electric solenoid.

11. An electromechanical actuator as claimed in claim 8, wherein said ratchet mechanism is releasable by means of an electric solenoid and a hand-operated release mechanism.

12. An electromechanical actuator as claimed in claim 9, wherein said electric solenoid is operative by pushing a pivoted lever unidirectionally acting on said dual arm lever to disengage said toothed ended first arm from said toothed wheel.

13. An electromechanical actuator as claimed in claim 12, wherein said hand-operated release mechanism is operative by forcing a second arm of said dual arm lever to disengage said toothed ended first arm from said toothed wheel, using an external tool.

14. An electromechanical actuator as claimed in claim 13, wherein said second arm of the dual arm lever is forced by turning a wavy faced ring fixedly attached to a shaft, resting against a complementary stationary wavy faced ring.

15. An electromechanical actuator as claimed in claim 14, wherein an intermediate wavy faced ring is inserted between said wavy faced rings.

16. An electromechanical actuator for a parking brake system of a vehicle, comprising:
   an electric motor;
   reduction gear train associated with said motor for transmitting motion from said motor to at least a single power transmission chain sprocket, said reduction gear train being of a non-locking type;
   at least one power transmission chain section drivable by said sprocket partly encircling at least one sheave, rotatably mounted on a free longitudinally movable pulley block, an end of said power transmission chain being attached to a first stationary anchor point;
   a connector connecting said pulley block to the vehicle's parking brake system; and
   a ratchet mechanism releasable by means of an electric solenoid for preventing said reduction gear train from rotation at least to the brake release direction.

17. An electromechanical actuator as claimed in claim 16, wherein said power transmission chain section, is a pair of identical power transmission chain sections, each having a first end and a second end, and both being driven by said dual power transmission chain sprocket partly encircling two outer sheaves of a main triple sheave, rotatably mounted on a free longitudinally movable pulley block, first ends of said pair of power transmission chain sections being attached to said first stationary anchor point.

18. An electromechanical actuator as claimed in claim 17, further comprising a single auxiliary flexible member section having a first and a second end, said flexible member being connected at its first end, to and between the second ends of said pair of power transmission chain sections, said single flexible member section partly encircling the central sheave of a secondary fixed triple sheave, partly encircling the central sheave of said main triple sheave, and being attached by its second end to a second stationary anchor point.

19. An electromechanical actuator as claimed in claim 18, wherein the first ends of said pair of power transmission chain sections are connected to each end of a tension equalizing lever, pivoted at its center to said first stationary anchor point.

20. An electromechanical actuator as claimed in claim 19, wherein said auxiliary flexible member is fixed by its second end, to said second stationary anchor point, via a tensioning spring.

21. An electromechanical actuator as claimed in claim 16, wherein said ratchet mechanism is further releasable by means of a hand-operated release mechanism.

22. An electromechanical actuator as claimed in claim 16, wherein said ratchet mechanism is operative by a toothed ended first arm of a pivoted, spring loaded, dual arm lever, engaged into a toothed wheel fixedly attached to one of the gears of said gear train.

23. An electromechanical actuator as claimed in claim 22, wherein said electric solenoid is operative by pushing a pivoted lever unidirectionally acting on said dual arm lever to disengage said toothed ended first arm from said toothed wheel.

24. An electromechanical actuator as claimed in claim 22, wherein said hand-operated release mechanism is operative by forcing a second arm of said dual arm lever to disengage said toothed ended first arm from said toothed wheel, using an external tool.

25. An electromechanical actuator as claimed in claim 22, wherein said second arm of the dual arm lever is forced by turning a wavy faced ring fixedly attached to a shaft, resting against a complementary stationary wavy faced ring.

26. An electromechanical actuator as claimed in claim 25, wherein an intermediate wavy faced ring is inserted between said wavy faced rings.

27. An electromechanical actuator as claimed in claim 16, wherein said reduction gear train is a three-stage spur gear train.

* * * * *